(12) United States Patent
Mitelman et al.

(10) Patent No.: US 11,611,569 B2
(45) Date of Patent: Mar. 21, 2023

(54) MACHINE LEARNING-BASED NETWORK DEVICE PROFILING

(71) Applicant: ENTIT SOFTWARE LLC, Sanford, NC (US)

(72) Inventors: Tamir Mitelman, Yehud (IL); Tammy Torbert, Sterling, VA (US)

(73) Assignee: Micro Focus LLC, Santa Clara, CA (US)

(*) Notice: Subject to any disclaimer, the term of this patent is extended or adjusted under 35 U.S.C. 154(b) by 709 days.

(21) Appl. No.: 16/428,422

(22) Filed: May 31, 2019

(65) Prior Publication Data
US 2020/0382527 A1 Dec. 3, 2020

(51) Int. Cl.
| | | |
|---|---|---|
| H04L 29/06 | (2006.01) | |
| H04L 9/40 | (2022.01) | |
| G06K 9/62 | (2022.01) | |
| G06F 16/9038 | (2019.01) | |
| G06N 20/20 | (2019.01) | |

(52) U.S. Cl.
CPC ...... *H04L 63/1416* (2013.01); *G06F 16/9038* (2019.01); *G06K 9/6267* (2013.01); *G06N 20/20* (2019.01)

(58) Field of Classification Search
CPC ............. H04L 63/1416; H04L 63/1425; G06F 21/552; G06F 21/554; G06F 30/27; G06F 16/9038; G06N 3/082; G06N 20/20; G06N 20/00; G06K 9/6267
See application file for complete search history.

(56) References Cited

U.S. PATENT DOCUMENTS

| | | | |
|---|---|---|---|
| 7,756,800 B2 * | 7/2010 | Chidlovskii | G06N 20/00 706/20 |
| 9,288,220 B2 | 3/2016 | Raugas et al. | |
| 9,667,636 B2 | 5/2017 | Komarek et al. | |
| 9,917,751 B2 | 3/2018 | Sasturkar et al. | |
| 10,339,468 B1 * | 7/2019 | Johnston | G06N 5/04 |

(Continued)

FOREIGN PATENT DOCUMENTS

CN 106790256 A * 5/2017

OTHER PUBLICATIONS

Pelleg, Dan, and Andrew Moore. "Active learning for anomaly and rare-category detection." Advances in neural information processing systems 17 (2004): 1073-1080. (Year: 2004).*

(Continued)

*Primary Examiner* — Khalid M Almaghayreh
(74) *Attorney, Agent, or Firm* — Sheridan Ross P.C.

(57) ABSTRACT

A method includes applying, by a computer, supervised machine learning to classify a network device that is associated with a security event occurring in a computer system based on data representing features of the network device. The security event is associated with a potential security threat to the computer system, and the classification of the network device by the supervised machine learning is associated with a confidence. The technique includes, in response to the confidence being below a threshold, applying an active machine learning classifier to the data to learn a classification for the data and using the classification learned by the active machine learning classifier to adapt the supervised machine learning to recognize the classification.

19 Claims, 8 Drawing Sheets

(56) References Cited

U.S. PATENT DOCUMENTS

| | | | | |
|---|---|---|---|---|
| 10,614,373 | B1* | 4/2020 | Jeffery | G06N 5/04 |
| 10,657,457 | B1* | 5/2020 | Jeffery | G06N 20/00 |
| 10,705,796 | B1* | 7/2020 | Doyle | G06F 7/08 |
| 2009/0099988 | A1* | 4/2009 | Stokes | G06F 15/16 |
| | | | | 706/20 |
| 2014/0180738 | A1* | 6/2014 | Phillipps | G06N 20/10 |
| | | | | 705/7.38 |
| 2014/0195466 | A1* | 7/2014 | Phillipps | G06F 16/00 |
| | | | | 706/12 |
| 2018/0150764 | A1* | 5/2018 | Stenneth | G06N 20/00 |
| 2018/0234302 | A1 | 8/2018 | James et al. | |
| 2018/0329935 | A1* | 11/2018 | Mugali | G06F 16/25 |
| 2018/0367561 | A1* | 12/2018 | Givental | H04L 63/1408 |
| 2019/0188212 | A1* | 6/2019 | Miller | G06N 7/005 |
| 2019/0377819 | A1* | 12/2019 | Filliben | G06N 3/084 |
| 2020/0097597 | A1* | 3/2020 | Lourentzou | G06F 16/35 |
| 2020/0250527 | A1* | 8/2020 | Zhao | G06N 3/0472 |
| 2020/0259861 | A1* | 8/2020 | Margel | H04L 63/1425 |
| 2020/0320430 | A1* | 10/2020 | Kunnumma | G06K 9/6262 |

OTHER PUBLICATIONS

Stokes, Jack W., et al. "Aladin: Active learning of anomalies to detect intrusions." (2008). (Year: 2008).*

"Using machine learning to classify devices on your network"; LAB41; https://gab41.lab41.org/using-machine-learning-to-classify-devices-on-your-network-538264c8b820; downloaded on Aug. 15, 2018; 11 pp.

Bar-Yanai; "Realtime Classification for Encrypted Traffic"; P. Festa (Ed): SEA 2010, LNCS 6049, pp. 373-385: 2010; 13 pp.

Li, Bingdon, et al; "A Supervised Machine Learning Approach to Classify Host Roles on Line Using sFlow"; 1information Technology 2Department of Computer Science and Engineering University of Nevada, Reno, Nevada 89557-0208; 2013, 8 pages.

Godfrey, Tan et al.; "Role Classification of Hosts within Enterprise Networks Based on Connection Patterns"; In USENIX Annual Technical Conference; www.citeseerx.ist.psu.edu/viewdoc/download?doi=10.1.1.57 . . . , 2003; 14 pp.

Meidan, Yair, et al.; "ProfilioT: A Machine Learning Apperach for LoT Device Identificalton Based on Network Traffic Analysis"; Department of Software and Information Systems Engineering, Ben-Gurion University, Beer-Sheva, Israel 2 Singapore University of Technology and Design, Singapore; 2017; 4 pages.

Venkatesan, R.; "A Novel Progressive Learning Technique for Multi-class Classification"; School of Electrical and Electronic Engineeing, Nanyan Technological University, Singapore; 6 pp.

Lison, P.; "An introduction to machine learning"; UiO, Language Technology Group, HiOA, Oct. 3, 2012; 35 pp.

Bachman, P., et al.; Learning Algorithms for Active Learning; 34th International Conference on Machine Learning; Sydney, Australia, PMLR 70, Jul. 31, 2017; 10 pp.

Rusu, A., et al.; "Progressive Neural Networks"; Google DeepMind, London, UK; Sep. 7, 2016; 9 pp.

* cited by examiner

MACHINE LEARNING-BASED NETWORK DEVICE PROFILING

BACKGROUND

An enterprise may have a staff of human analysts (analysts of a security operations center (SOC), for example) that investigate certain events that occur in the enterprise's computer system for purposes of identifying and addressing security threats to the system. For example, the analysts may investigate activity associated with events that trigger security alerts for purposes of assessing whether the events correspond to actual security threats to the computer system; and for identified security threats, the analysts may identify areas of concern (host computers, user accounts, and so forth) and determine the appropriate remedial actions (address blocking, device isolation, quarantining software, and so forth) to be taken.

DETAILED DESCRIPTION

Figure 1:
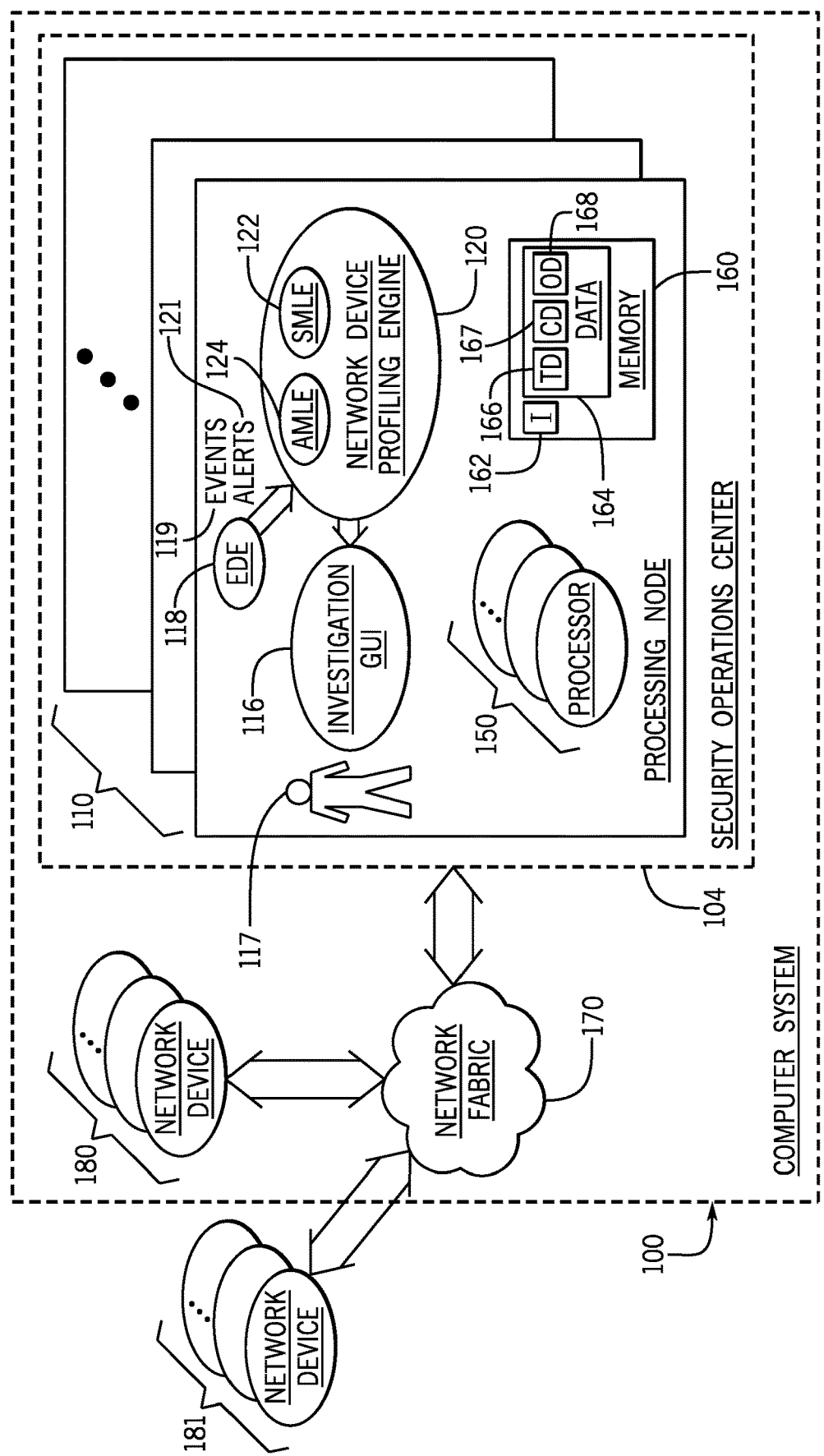
FIG. 1 is a schematic diagram of a computer system according to an example implementation.

Referring to FIG. 1, in accordance with example implementations, a computer system 100, such as a computer system of an enterprise, may include network devices 180. The network device 180 may be, in general, any component of the computer system 100, such as (as examples) a switch, a gateway, a router, a server, a client, a desktop computer, a tablet computer, a web server, a wearable computer, a portable computer, a smartphone, a thin client, a rack-mounted computer, a cluster of computers, and so forth. The computer system 100 may also communicate with external network devices 181, which may be any of the aforementioned network devices, as well as other devices. In the following description, unless otherwise noted, a "network device" refers to either an internal network device 180 or an external network device 181.

In general, the computer system 100 may be a public cloud-based computer system, a private cloud-based computer system, a hybrid cloud-based computer system (i.e., a computer system that has public and private cloud components), a private computer system having multiple computer components disposed on site, a private computer system having multiple computer components geographically distributed over multiple locations, and so forth.

As depicted in FIG. 1, the computer system 100 may include network fabric 170. Although FIG. 1 depicts the network fabric 170 as being separate from the network devices, it is noted that a particular network device and network device profile, as discussed herein, may be related to a particular device of the network fabric 170. In general, the network fabric 170 may include components and use protocols that are associated with one or multiple types of communication networks, such as (as examples) Fibre Channel networks, iSCSI networks, ATA over Ethernet (AoE) networks, HyperSCSI networks, local area networks (LANs), wide area networks (WANs), global networks (e.g., the Internet), wireless networks, or any combination thereof.

For the example implementation that is depicted in FIG. 1, the computer system 100 may include one or multiple processing nodes 110. In accordance with example implementations, a processing node 110 is an actual physical machine that contains hardware, such as a memory 160 and one or multiple physical hardware processors 150 (one or multiple central processing units (CPUs), one or multiple CPU cores, and so forth). In general, the memory 160 is a non-transitory memory that may be formed from, as examples, semiconductor storage devices, phase change storage devices, magnetic storage devices, memristor-based devices, a combination of storage devices associated with multiple storage technologies, and so forth. Regardless of its particular form, the memory 160 may store various data 164, such as training set data 166, classification data 167 and observed feature set data 168, as further described herein). Moreover, the memory 160 may store instructions 162 that, when executed by the processor(s) 150, cause the processor(s) 150 to form one or multiple components of the processing node 110, such as, for example, a network device profiling engine 120, an investigation graphical user interface (GUI) 116, an event detection engine 118, and so forth, as further described herein.

In accordance with some implementations, the processor 150 may be a hardware circuit that does not execute machine executable instructions. For example, in accordance with some implementations, the network device profiling engine 120 may be formed in whole or in part by an application specific integrated circuit (ASIC), a field programmable gate array (FPGA), and so forth. Thus, many implementations are contemplated, which are within the scope of the appended claims.

The processing node 110 may or may not provide one or multiple virtual environments (virtual machines, docker containers, and so forth), depending on the particular implementation.

As depicted in the example implementation of FIG. 1, the processing node 110 may contain one or multiple automated event detection engines 118. In general, the automated event detection engine 118 may generate alerts 121 (displayed on-screen notifications, emails, and so forth) for purposes of alerting human security analysts 117 (analysts who staff a security operations center 104, as an example) to certain events 119 (login failures, communications with known malware sites, anomalous network activity, and so forth) that have occurred recently in the computer system 100 and which may be associated with security threats. In general, the analysts 117 may use processor-based tools for purposes of conducting security threat investigations to determine whether alerts 121 and security events 119 are associated with actual security threats to the computer system 100; and if so, determining the appropriate remedial actions to respond to the threats. As examples, the processor-based tools may be part of a security information and event management (SIEM) system, a security analytics system or a business intelligence system.

The events 119 are associated with "event data." In this context, the "event data" refers to data produced by operation of the computer system 100 and may originate with the various network devices 180 and 181 that are associated with the computer system 100. A given event 119 and/or alert 121 may be associated with event data that corresponds to one or multiple network devices. As examples, the event data may be data representing or derived from hypertext protocol (HTTP) logs, domain name service (DNS) logs, virtual private network (VPN) logs, netflow traffic, intrusion detection system (IDS) logs, and so forth.

As depicted in FIG. 1, the processing node 110 may further include one or multiple graphical user interfaces (GUIs), such as investigation GUIs 116, that are used by the security analysts 117 to conduct security threat investigations. In general, an "investigation GUI 116" refers to a processor-based tool (i.e., a tool formed at least in part by a hardware processor) that may be used by a human security analyst 117 to conduct a security threat investigation. A given investigation may involve multiple investigative steps in which a human security analyst 117 provides input (via mouse clicks, mouse movements, keyboard strokes, and so forth) to the investigation GUI 116, and the investigation GUI 116 provides an output (visual images on a hardware monitor, audio output, files, and so forth).

As an example, the investigation GUI 116 may include a "search" section in which the security analyst 117 may enter input and view output representing a result of that input for purposes of conducting a "search" for a particular investigative step of an investigation. The search section may be used by the security analyst 117 to create multiple search instances. Each search instance may be associated with an independent investigation, or multiple search instances may be associated with the same investigation.

As examples, a search instance may be a window (of the GUI 116) in which the security analyst 117 may enter a query search for information pertaining to particular devices of the computer system 100, user accounts, and so forth. Moreover, the search instance may allow the analyst to enter parameters that constrain the queries, such as a time range and various filters; and the search instance may include a visualization region, where charts pertaining to the search are created for purposes of conducting comparative analyses of search results. In general, the creation of a chart may involve the analyst selection of a chart type, axes for the chart, filters and other parameters.

The investigation GUI 116 may contain other and/or different features, in accordance with further example implementations. For example, the investigation GUI 116 may contain a search listing section, which displays identifiers for the different ongoing search instances. In this manner, the security analyst 117 may "click" on one of these identifiers for purposes of displaying a current or previous search instance in the foreground.

In general, the investigation of a given security threat may involve a number of inquiries, analyses and decisions that are made by a security analyst 117 in a series of investigative steps. As examples, a given investigative step may include the security analyst making a decision to identify which events and/or which category of data is to be evaluated next; decisions pertaining to selecting the types of charts for analysis of gathered data; decisions pertaining to chart parameters (e.g., the axes, filters, categories, time granularity), and so forth. The investigation may involve a sequence of investigative steps, where each step may involve particular data, devices and/or events, visualization of the gathered information and/or the analysis of the gathered information.

The investigative steps that are taken by a security analyst 117 in performing a given security threat investigation may initially target network devices that are associated with a set of one or multiple events 119 and/or one or multiple alerts 121. However, the investigation may focus on additional network devices that turn up as part of the investigation. The event data associated with a particular security event 119 and/or alert 121 may be relatively sparse. For example, the associated event data may identify a host and its internet protocol (IP) address without further information about the host; or as another example, the event data may identify a name of the host without further information.

In accordance with example implementations that are described herein, a network device profiling engine 120 of the processing node 110 applies machine learning to features of a given network device for purposes of generating a profile (herein called a "network profile") for the network device. As described further herein, the features of the network device may be provided by network data, as well as different types of data that are associated with the network device (e.g., end point data, operation system data, application data, database data, and so forth). This network profile may be displayed on the investigation GUI 116. In this way, as the security analyst 117 investigates a particular security threat and analyzes event data associated with various network devices, profiles for these network devices may be determined by the network device profiling engine 120 and displayed on the investigation GUI 116.

In this context, the "profile," or "profile information," for a given network device refers to information about one or multiple characteristics of the network device, such as whether the device is a client or server, the operating system that executes on the network device, application software that executes on the network device, and so forth, as further described herein. As more specific examples, a network profile for a host (a particular network device) may describe whether the host is a client or a server; if a server, the type of server (an email server, a domain name service (DNS) server, a web proxy server, a database server, and so forth); if a client, the type of the client (a personal computer, a mobile device, a tablet, and so forth, as examples); an operating system used by the host device; a version of the operating system or other application used by the host device; a network (a demilitarized zone (DMZ), for example); and possibly other information.

The network device profiles that are generated by the network device profiling engine 120 aid the security analysts 117 in understanding the network devices under investigation in a more timely fashion. The machine learning-based profiling of network devices may be a daunting challenge, however. Information technology (IT) environments have become increasingly complex and unpredictable with the variety of offerings in operating systems, applications, servers, hybrid environments (physical and virtual), and frequent upgrades, and new offerings. Moreover, a particular business organization may allow users to "bring your own device," which further complicates determining specific information for a given network device. Additionally, in today's computer system environments, the deployment of a new server or the connection of a new device may not be limited to network administrators, as non-administrator employees may also deploy network devices in their own sub-networks or labs and may introduce new network devices having different types or characteristics in the process of adding these network devices.

Complicating determining information about the network devices, the same operating system may serve multiple different types of hosts. For example, a given operating system having a particular version may serve many distinct types of hosts, such as dynamic host control protocol (DHCP) servers, DNS servers, web servers, file servers, storage servers, and so forth. Additionally, a particular type of server may have many different types of applications. For example, a database server may be a SQL or Oracle® server; a DNS server may be a Microsoft®, BIND or OpenDNS server; and so forth. As another example, an email server may be an exchange server or other server. Moreover, the particular type of host and/or applications executing on the host may not reveal the operating system of the host.

One approach to provide network device profiles is to classify the network devices using supervised or unsupervised machine learning. In supervised machine learning, an algorithm is trained using observations, called "instances," which have associated explanatory variables called "features," and associated "labels." A "label" is the identification of data or an instant as a certain class, either manually (in the process of the training, for example) or automatically by a machine learning classification algorithm. A "classifier" refers to the algorithm or function that is deduced by the machine learning that maps the input (i.e., the features learned from the observed instances) into an output (i.e., a label, or "class"). Here, the "features" refer to not only the features directly tied to the network devices but any data or event associated with the network device, such as network data, end point data, application data, database data, and so forth.

One approach to classify network devices for purposes of providing profiles for the network devices is to use supervised machine learning or unsupervised machine learning. However, such approaches may be insufficient in the face of current IT environments, which are complex (e.g., formed from various physical and virtual configurations, formed from private and public components, and so forth), dynamic and not deterministic over time. In this manner, the mere application of machine learning (whether supervised learning or unsupervised learning), involves introducing new labels, features and data to the machine learning algorithm on the go, thereby rendering the algorithm less effective over time. Moreover, a complete profile for a given network device may include multiple layers, obtained from multiple different data sources, which is not available using classic machine learning. The more details about a network device that are provided to an analyst allow the analyst to more efficiently and effectively perform an investigation involving the network device.

In accordance with example implementations that are described herein, the network device profiling engine 120 includes a supervised machine learning engine 122 that classifies network devices based on feature sets that are derived from network data associated with the network devices. In this context, "network data" refers to any data associated with the network device, whether a network device directly corresponding to the network device, or other data, such as end point data, operation system data, application data, and so forth, which may be used to profile the network device. As described further herein, the classification, or profiling, of the network devices is based on the simultaneous use of different types of data in order to provide fuller and relatively more accurate profiles for network devices through machine learning. For example, a network device may be a host, and the security alert may identify a particular host name or IP address associated with the host. The supervised machine learning engine 122 may then, based on data extracted from the computer system 100 and associated with the network device, apply one or multiple models for purposes of classifying the network device into one or multiple classes. The combination of classifications, in turn, form a profile for the network device and provide valuable information, which the security analyst 117 may use to further the investigation of a security threat.

The use of supervised machine learning by itself, however, may be a relatively inefficient and ineffective way to derive information for network device classifications and profiles, given the above-referenced complexity and unpredictability in modern IT infrastructures. In this manner, the types of network devices and their characteristics may not be deterministic over time, as these types and characteristics may not be predetermined or predictable. Accordingly, relying solely on supervised machine learning may be rather limited and over time may present false results, as such an approach relies on a training set of data that includes a full variety of network devices and their characteristics, which may be unrealistic in today's IT environments.

In particular, applying supervised machine learning to derive a network device profile may encounter one or more of the following challenges. The first challenge may be related to the different types of data with correspondingly different features. For example, network data may be associated with particular ports or bytes, which do not exist in operating system-related data. As such, in accordance with example implementations, the supervised machine learning engine may apply different models, or classifiers, to the input data to identify the label or category for the network device accurately. As described herein, in accordance with some implementations, the supervised machine learning engine 122 may employ ensemble machine learning, which uses multiple classifiers simultaneously, where each model is a "best fit" for a certain type, or category, of data.

Another challenge to network device profiling may pertain to the same network device serving more than one role. For example, a particular network device may be a server that has different roles: a first role in which the server is a web server, and another role in which the server is a load balancer. For this example, the supervised machine learning engine 122 may use one classifier that identifies the server as a web server, whereas another classifier that is used by the supervised machine learning engine 122 may identify the same server as a load balancer. This is an example of using multiple labels for the same dimension. However, multiple label classification may also be used for profiles in which there are multiple dimensions, such as profiles that classify network devices as being either clients or servers in addition to being associated with a particular operating system, being associated with an application, and so forth. In this manner, each of the dimensions may be a label, as further described herein.

Another challenge to network device profiling may pertain to the IT environment being dynamic and evolving constantly. For example, a new database type may emerge, another server that never existed before may be added, a new operating system that the organization never used before or a new version of an existing operating system may be introduced, and so forth. Hence, the use of the relatively static supervised machine learning and a corresponding training dataset may be limited to the network devices and characteristics that exist at a certain point in time when the associated training data set is collected. Moreover, the supervised machine learning may assume that all types and characteristics that exist are collected and labeled for the model. However, this model may not identify network device types and characteristics that are not part of the initial training data set. As such, over time, a training data set or at least part of it may become obsolete, as network devices are upgraded and/or repurposed. Moreover, if the classes, or labels, provided by the models that are used in the supervised machine learning are not updated or discarded, the models may become inaccurate, resulting in false classifications, i.e., inaccurate information pertaining to the network device profiles.

A given security operations center may investigate a relatively large number (hundreds to possibly thousands) of potential security threats per day. Therefore, accurate network device profiling that accommodates ever-involving network devices is vital to ensuring that the security analysts 117 identify and focus on key security threat actors. In accordance with example implementations that are described herein, the network device profiling engine 120 uses a progressive machine learning-based approach to classify network devices in a way that adapts to ever-changing features of the devices.

More specifically, in accordance with example implementations, the progressive machine learning that is used by the network device profiling engine 120 is a combination of supervised machine learning and active machine learning. In this manner, in accordance with example implementations the network device profiling engine 120 may apply one or multiple supervised machine learning classifiers (via a supervised machine learning engine 122) for purposes of deriving classifications for network devices that are associated with events 119 and providing (via the investigation GUI 116) profiles for the network devices 180 based on the determined classifications. For each classification, the supervised machine learning engine 122 may also generate an associated confidence score for the classification. The confidence score may be a number, or level, which represents how "confident" the model is in its identification. Some machine learning algorithms generate confidence scores as a part of the algorithms, and for other algorithms, the confidence may be calculated by another component of the network device profiling engine 120. The confidence scores, in turn, provide feedback to the network device profiling engine 120 so that the engine 120 may decide which classifications (and their corresponding feature sets) to designate as being candidates for active machine learning.

More specifically, during training of the supervised machine learning engine 122, observations may be made regarding the overall accuracy of the supervised machine learning engine 122 based on "labeled" feedback. For example, security analysts 117 may feed the supervised machine learning engine 122 with labeled training data, observe the resulting classifications by the supervised machine learning engine 122, and from this information, the analysts 117 may derive a confidence score threshold. For example, it may be observed that the supervised machine learning engine 122 has an accuracy of eighty percent, and this observed accuracy may be used as a confidence score threshold. Therefore, should the supervised machine learning engine 122 generate a classification for a particular network device whose associated confidence score falls below the confidence threshold, then the network device profiling engine 120 may designate this classification (and its feature set) as candidate that may be used by an active machine learning engine 124 of the network profiling engine 120 to learn the correct classification and correspondingly develop a training set that is used to retrain, or update, the supervise machine learning engine 122.

More specifically, in accordance with example implementations that are described herein, the active machine learning engine 124 receives feature sets, which have associated confidence scores that are below the confidence score threshold for the supervised machine learning engine 122. In other words, these feature sets are treated as being unlabeled for purposes of active machine learning. The features sets are candidate feature sets, in that the active machine learning engine 124 may filter the candidate feature sets. The filtering discriminates among the candidate feature sets to select a representative subset of the candidate feature sets; and the active machine learning engine 124 may then take action to determine the correct classifications, or labels, for these feature sets.

In accordance with example implementations, for purposes of determining the labels, the active machine learning engine 124 queries informational data sources, such as experts (the security analysts 117, for example), an IT assets list, or an online data source, such as a configuration management database (CMDB). As a more specific example, for a particular feature set representing features that are associated with a particular network device, the active machine learning engine 124 may query a CMDB with the network device's Internet Protocol (IP) address for purposes of retrieving from the CMDB actual configuration information for the network device 180, i.e., for purposes of retrieving the correct "label" for the network device 180. In accordance with example implementations, the now correctly labeled feature set is used to further train, or adapt, the supervised machine learning engine 122 so that the supervised machine learning engine 122, in the future, appropriately classifies network devices with similar features. As another example, the active machine learning engine 124 may provide a prompt on the investigation GUI 116, asking a security analyst 117 to provide profile information for the network device.

Thus, in accordance with example implementations, the supervised machine learning engine is constantly and continuously adapted with new labels, features and data so that the supervised machine learning algorithm is automatically adapted to the ever evolving and changing IT environment. In other words, the machine learning system disclosed herein is a progressive learner to evolve the network profiling with the changing IT environment. In accordance with example implementations described herein, this progressive learning may involve the use of a neural network for the supervised machine learning, and the neural network is continually and constantly adapted to the changing IT environment through the use of neurons and neural connections being added to the neural network to achieve the progressive learning.

Figure 2:
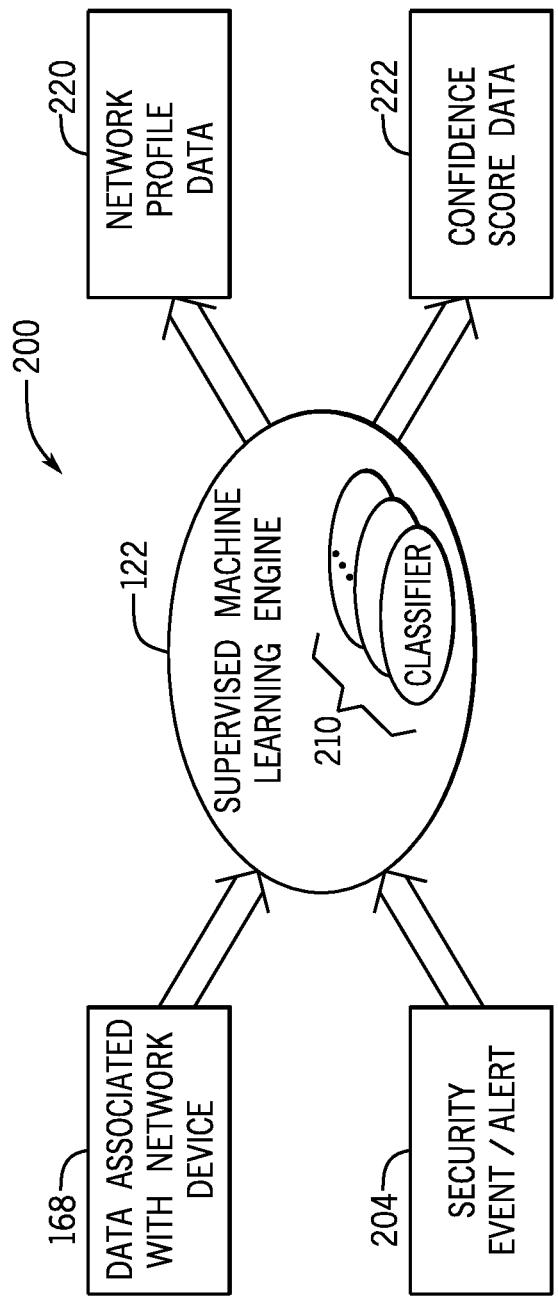
FIG. 2 is an illustration of a process to use a supervised machine learning engine to provide a profile for a network device associated with a security event and a confidence score associated with the profile according to an example implementation.

FIG. 2 is an illustration of a process 200 that may be used by the supervised machine learning engine 122 to generate network device profile data 220, in accordance with example implementations. Referring to FIG. 2 in conjunction with FIG. 1, the supervised machine learning engine 122 may receive data 204 representing a security event, which may identify one or multiple network devices. The network device profiling engine 120 may extract data 168 associated with the network device(s) from the computer system 100, extract one or multiple features from the data 168, and use one or multiple models 210 to identify one or multiple classes that correspond to the features. It is noted that the data 168 may also represent features for network devices that may not initially be identified by event data but may be identified as part of a security threat investigation. As examples, the data 168 may come from a variety of different sources, such as data from the network device 180 being profiled (configuration information read from the network device 180, for example), log files containing data describing messages or events associated with the network device 180 being profiled, data contained in security alerts identifying the network device 180 being profiled, log files containing data describing activities of devices in the same subnet as the network device 180, data provided by a security analyst 117 about the network device 180 being profiled, information about the network device 180 being profiled stored in tables on other network devices 180, and so forth.

The supervised machine learning engine 122 applies one or multiple classifiers 210 (a classifier 210 for each data type, or category, for example) to the feature set represented by the network device to classify the network device; and this classification, in turn, corresponds to network profile data 220 that represents a network profile for the network device. As also depicted in FIG. 2, the supervised machine learning engine 122 generates confidence score data 222 representing a confidence score for the classification (i.e., a confidence regarding the determined network profile for the network device).

Figure 3:
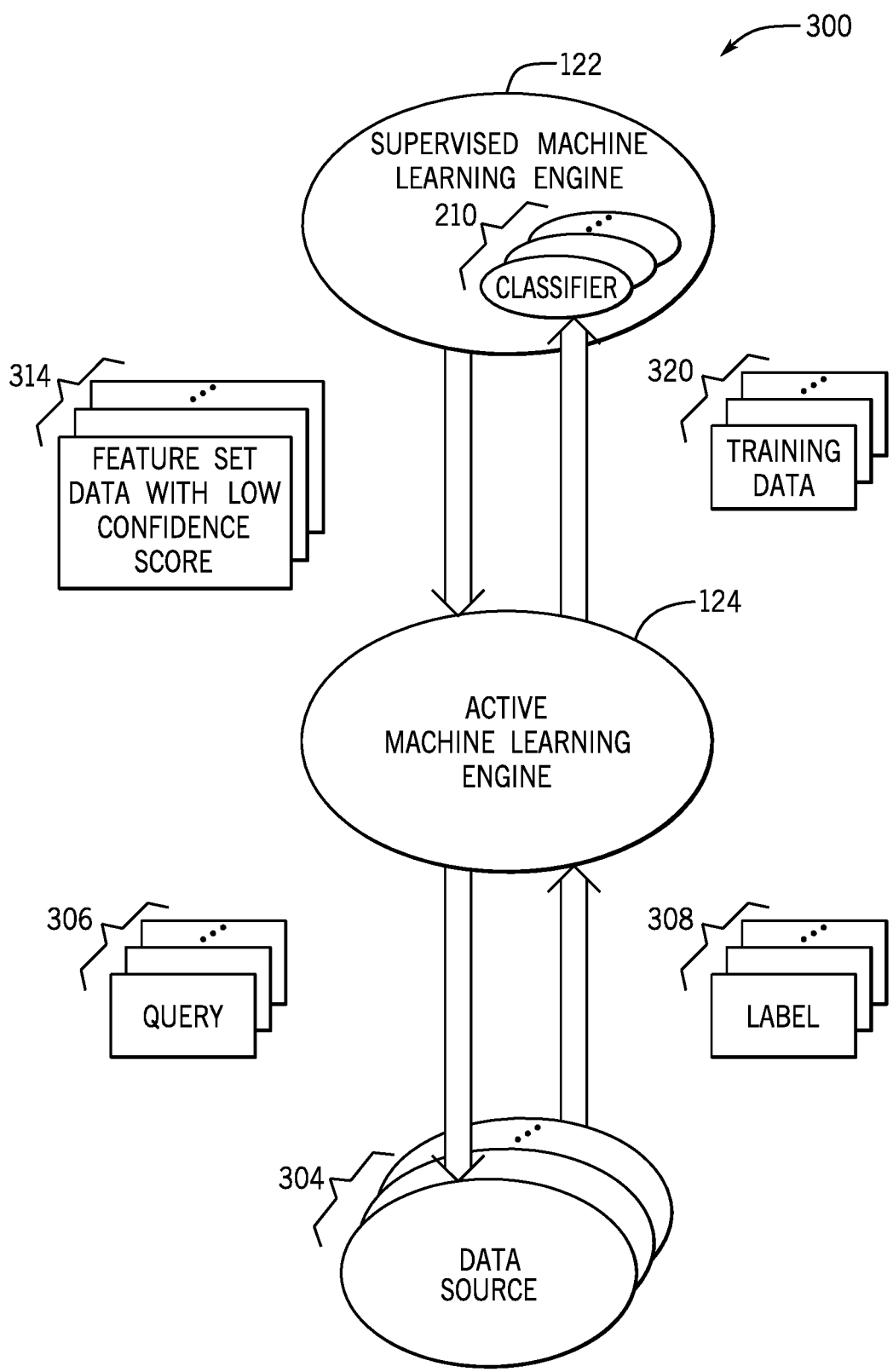
FIG. 3 is an illustration of a progressive machine learning process that uses active machine learning to adapt the supervised machine learning engine of FIG. 2 to new feature sets and classifications according to an example implementation.

FIG. 3 illustrates a progressive machine learning process 300 that may be used by the network device profiling engine 120 in accordance with example implementations. Referring to FIG. 3 in conjunction with FIG. 1, the supervised machine learning engine 122 communicates feature set data 314 that have relatively low associated confidence scores (i.e., the data 314 represents feature sets whose classifications by the supervised machine learning engine 122 had associated confidence scores below a particular confidence score threshold) to the active machine learning engine 124. For the feature set data 314, the active machine learning engine 124 selects a representative subset of the associated feature sets and generates corresponding queries 306 to one or multiple data sources 304 for purposes of determining the correct labels 308 for these features sets. Accordingly, the active machine learning engine 124 produces corresponding sets of training data 320 (i.e., sets of feature sets and their corresponding labels), which may then be used to train the classifier(s) 210 of the supervised machine learning engine 122. In this context, the training of the supervised machine learning engine 122 refers to the algorithm employed by the engine 122 evolving to reflect new labels, new features, and changes to the IT environment, which were never previously seen by the algorithm.

In accordance with some implementations, the supervised machine learning engine 122 may be a neural network (a deep learning neural network, a recurrent neural network (RNN), and so forth). In general, an artificial neural network may be trained to learn a task without task-specific programming. The neural network is a collection of nodes, called "neurons," and the neurons, in general, are connected such that a given neuron may receive one or multiple signals, process these signals and then signal neurons connected to the given neuron. As an example, the signals received by a particular neuron may be real numbers, and the corresponding output of the given neuron may be a non-linear function of these inputs. The supervised machine learning engine 122 may, for example, assign weights to the neurons such that by applying the non-linear functions and the appropriate weights, the supervised machine learning engine 122 uses the neural network to provide output signals representing a current set of classes and training data. For purposes of being retrained with the training data 320, the supervised machine learning engine 122 may, for example, adjust the weights of one or multiple neurons, create one or multiple connections between existing neurons, create one or multiple additional neurons, remove neurons, and so forth.

During the learning phase, the neural network may learn by adjusting weights, neuron connections, neurons, and so forth, so that the neural network is able to predict the correct class label of input tuples. Moreover, in accordance with example implementations, there may be hidden layers in a particular model, depending on the function that is mapped by the model. When new data is identified to represent a new class, in accordance with example implementations, new neurons and connections may be created, while all model parameters and weights may be updated to represent the newly updated set of classes.

Figure 4:
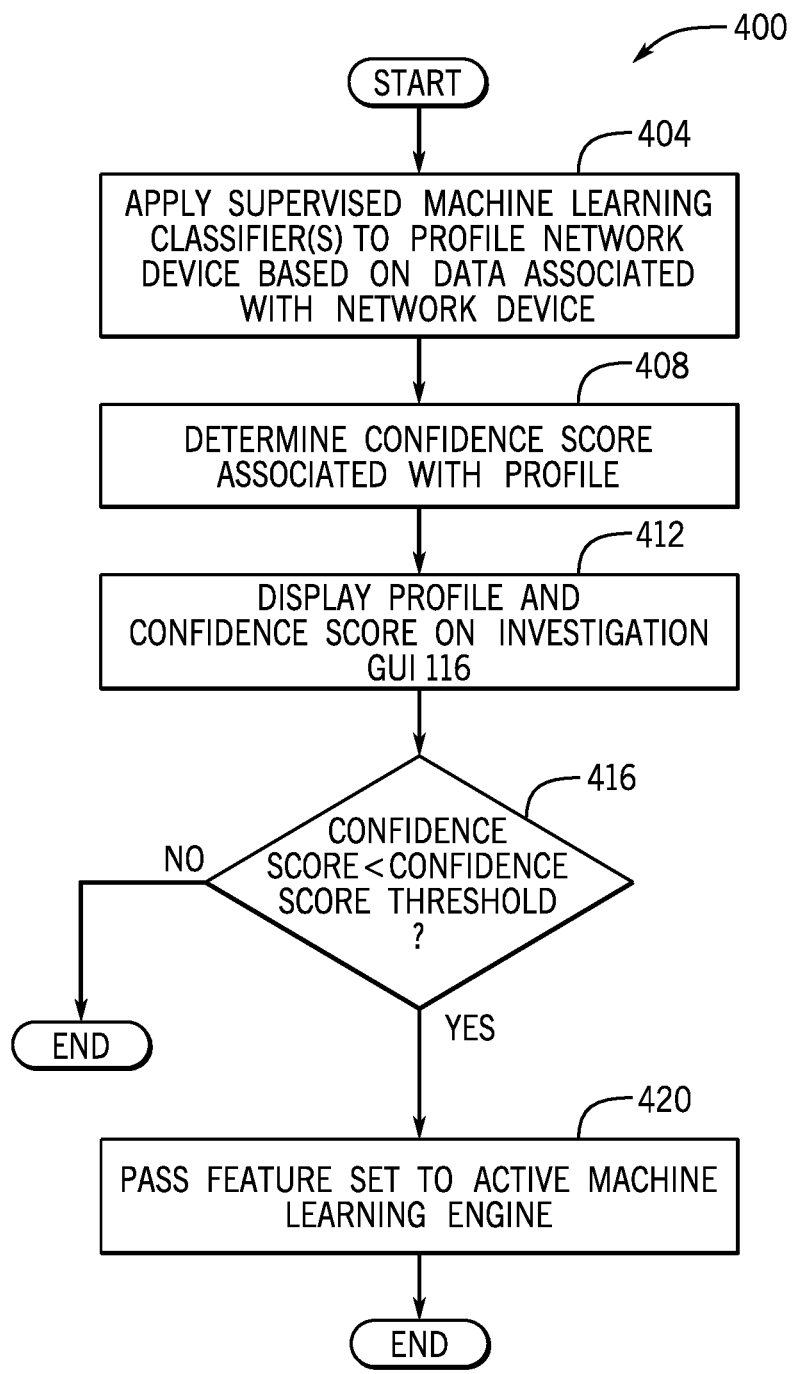
FIG. 4 is a process depicting a technique to control when active machine learning is invoked to train supervised machine learning classifiers according to an example implementation.

Thus, referring to FIG. 4 in conjunction with FIG. 1, in accordance with example implementations, the network device profiling engine 120 may perform a process 400, which includes applying (block 404) one or multiple supervised machine learning classifiers to classify a network device based on data that is associated with the network device. Pursuant to block 408, a confidence score that is associated with the classification is determined, and the determined classification and the confidence score may be displayed, pursuant to block 412, on the investigation GUI 116. If a determination is made (decision block 416) that the confidence score is less than a confidence score threshold, then the feature set associated with the classification is passed (block 420) to the active machine learning engine.

A network device profile may, in accordance with example implementations, contain multiple labels, and the labels may, for a given network device, be associated with one dimension or multiple dimensions (i.e., may be associated with multiple classes), as the profile may be characterized by a variety of different characteristics (server/client, DB/email/FTP/etc., PC/Mobile/Tablet, OS, networks, etc.). Moreover, the same network device may have more than one role, such as, for example, a web server that is also a load balancer. Therefore, in accordance with example implementations, the supervised machine learning engine uses a multiple label machine learning algorithm, i.e., uses multiple classifiers. For example, in accordance with some implementations, the supervised machine learning engine 122 may use a classifier chain method. As another example, in accordance with further implementations, the supervised machine learning engine 122 may use an adapted algorithm (such as an extended version of AdaBoost) or, in accordance with further implementations, may use a multiple label stream classification algorithm, such as Online Bagging.

Referring back to FIG. 2, using multiple types of input data (e.g., network data, operating system data, end point data, and so forth) may allow the network device profiling engine 120 to increase accuracy and identification for generating the network device profiles. Different types of data may have different structures, different features and different values. Accordingly, no single model may fit all of these different types of data classes. In accordance with some implementations, each type of data may be considered separately and use a different machine learning algorithm to achieve the most accurate identification. In other words, in accordance with some implementations, the supervised machine learning engine 122 may use a plurality of classifiers 210, with each of the classifiers 210 being associated with a different data type. In accordance with further example implementations, a particular model may consider multiple types of data in a data fusion approach.

As a more specific example, in accordance with some implementations, the supervised machine learning engine 122 may use ensemble learning to produce a more accurate result than any individual model. For example, a type of ensemble learning called "stacking" may be used in some implementations, and in other implementations, an ensemble learning technique called "boosting" may be used.

With ensemble-based classification, there may be cases where individual classifiers classify a given network device differently and/or generate contradicting classifications for the network device. In accordance with example implementations, the supervised machine learning engine 122 may intelligently combine the individual outputs produced by the individual learning algorithms (and models) into a single output (i.e., a single classification and corresponding network profile) in a way that overcomes such challenges, while at the same time increases the accuracy of the classification.

Figure 5:
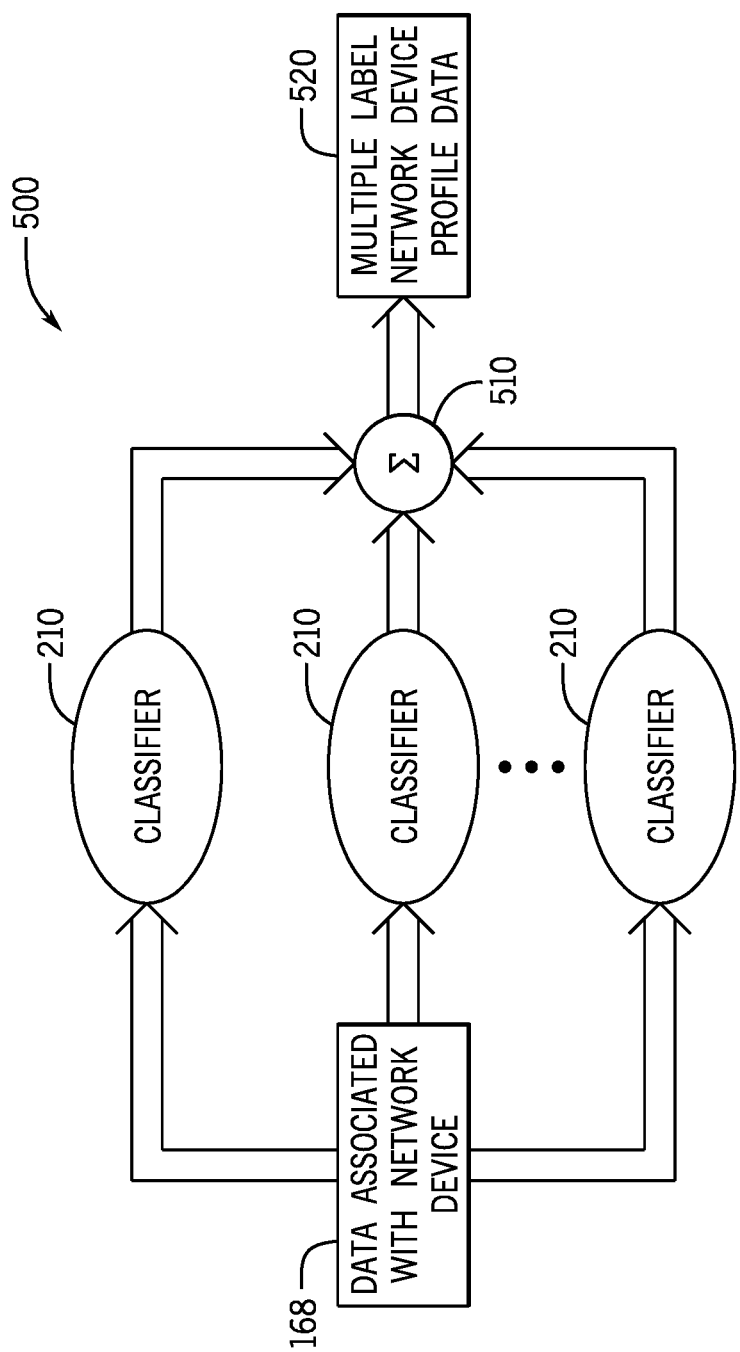
FIG. 5 is an illustration of an ensemble machine learning process to generate multiple label network device profile data according to an example implementation.

Referring to FIG. 5 in conjunction with FIG. 1, as a more specific example, in accordance with some implementations, the supervised machine learning engine 120 may use an ensemble machine learning process 500 that uses multiple supervised machine learning classifiers 210. Each classifier 210, in turn, may be associate with a different data type (an operating system data type, a network fabric data type, and so forth). The data 168 associated with the network device is provide to the classifiers 210, resulting in multiple classifications that are combined (as indicated by reference numeral 510) to generate a multiple label network device profile represented by data 520.

In accordance with some implementations, the combining 510 of the classifications may be based on voting. In an example implementation, each distinct classification may be assigned a vote, so that if there are multiple different classifications, the classification that has the highest number of votes is assigned to the network device.

In accordance with some implementations, each classifier 210 may assign a confidence score to its classification. In this manner, in accordance with example implementations, in the identification for which the confidence is "low" or below a predefined, or dynamically set threshold, it may be considered as failing; and as such, the classification may not be used. In accordance with example implementations, if the confidence score is below the threshold for all of the classifications, then the feature set may be passed as a candidate to the active machine learning engine 124, as described herein.

Figure 6:
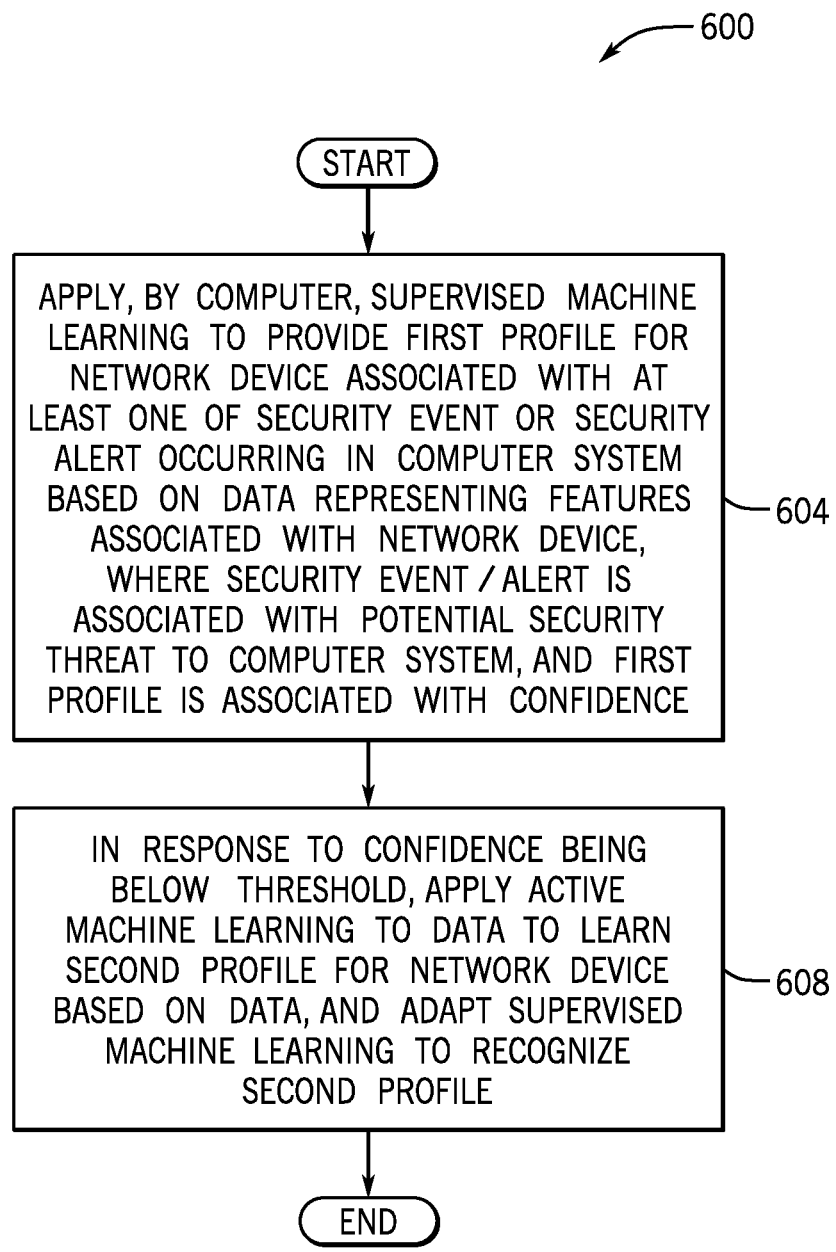
FIG. 6 is a flow diagram depicting a technique to use supervised machine learning and active machine learning to classify a network device associated with a security event according to an example implementation.

Thus, referring to FIG. 6, in accordance with example implementations, a technique 600 includes applying (block 604), supervised machine learning to provide a first profile for a network device that is associated with at least one of a security event or a security alert occurring in a computer system based on data representing features associated with the network device. The security event/security alert is associated with a potential security threat to the computer system, and the first profile is associated with a confidence. The technique 600 includes, pursuant to block 608, in response to the confidence being below a threshold, applying active machine learning to the data to learn a second profile for the network device based on the data and adapting the supervised machine learning to recognize the second profile.

Figure 7:
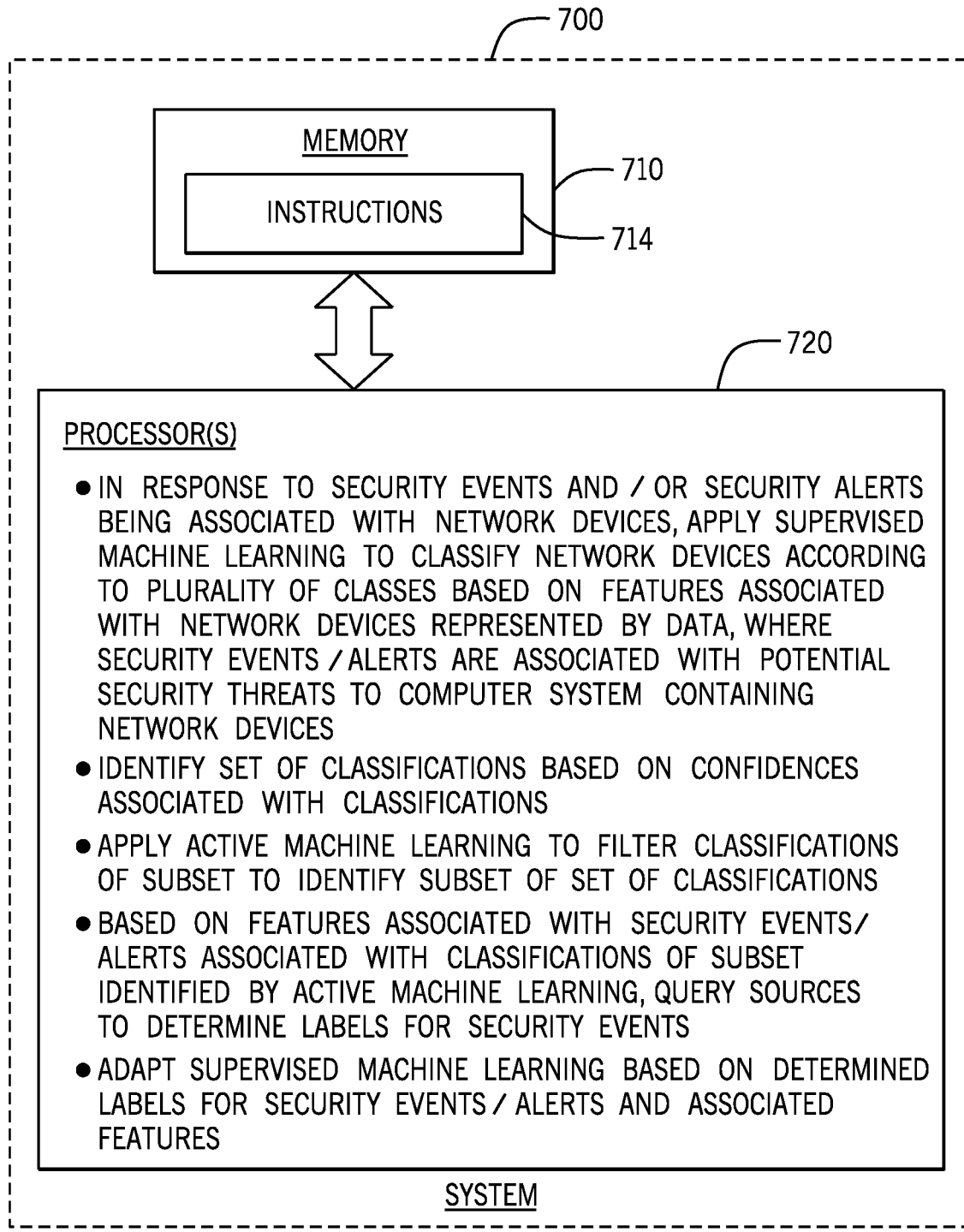
FIG. 7 is a schematic diagram of a system to use supervised machine learning and active learning to classify network devices associated with security events according to an example implementation.

Referring to FIG. 7, in accordance with example implementations, a system 700 includes at least one processor 720 and a memory 710 to, when executed by the processor(s) 720, cause the processor(s) 720 to, in response to at least one of security events or security alerts being associated with network devices, apply supervised machine learning to classify the network devices according to a plurality of classes based on features associated with the network devices represented by data. The security events/security alerts are associated with potential security threats to a computer system containing the network devices. The instructions 714 when executed by the processor(s) 720, cause the processor(s) 720 to identify a set of the classifications based on confidences associated with the classifications, apply active machine learning to filter the classifications of the subset to identify a subset of the set of classifications; based on features associated with the security events associated with the classifications of the subset identified by the active machine learning, query sources to determine labels for the security events; and adapt the supervised machine learning based on the determined labels for the security events and the associated features.

Figure 8:
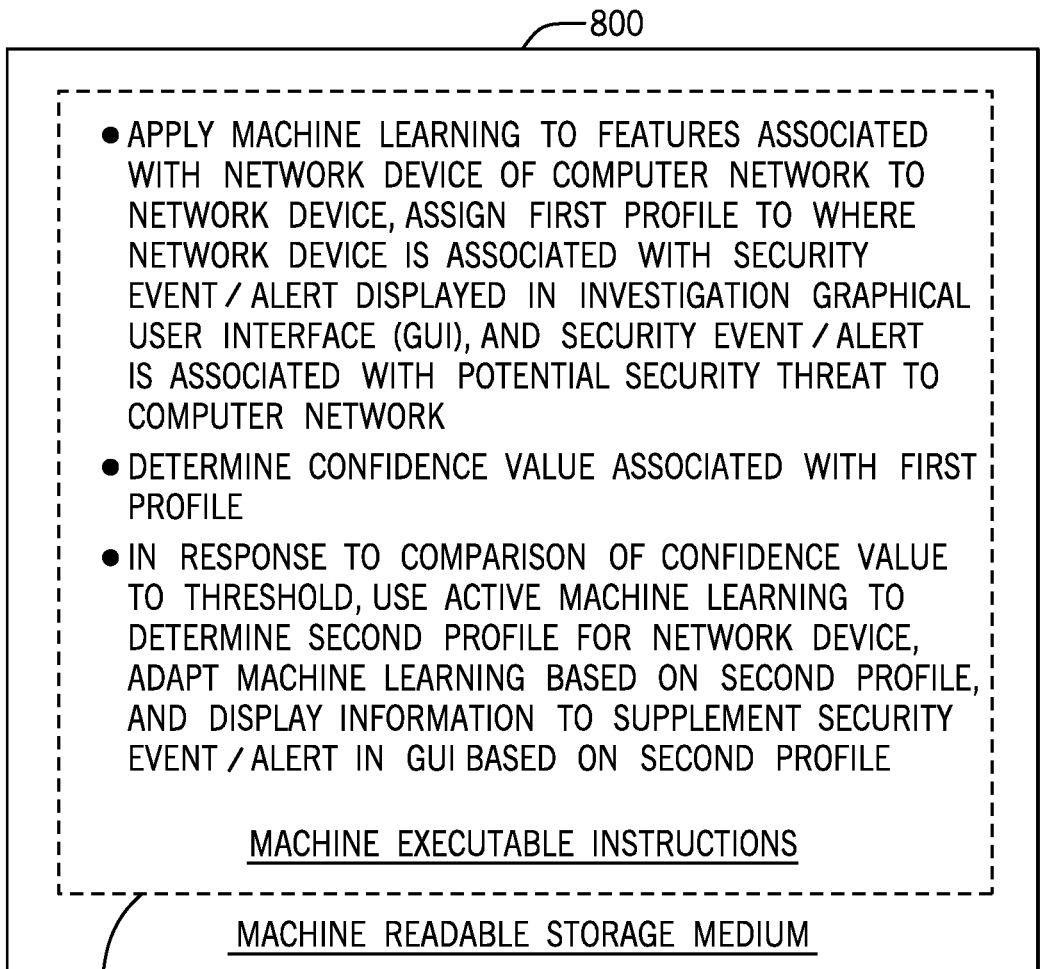
FIG. 8 is an illustration of machine executable instructions stored on a machine readable storage medium that, when executed by a machine, cause the machine to, through a graphical user interface (GUI), display network device information associated with a security event using machine learning-based classification of the network device according to an example implementation.

Referring to FIG. 8, in accordance with example implementations, a non-transitory machine readable storage medium 800 stores instructions 818 that, when executed by a machine, cause the machine to apply machine learning to features that are associated with a network device of a computer network to classify the network device as belonging to a first profile. The network device is associated with at least one of a security event or a security alert that is displayed in an investigation graphical user interface (GUI), and the security event is associated with a potential security threat to the computer network. The instructions 818, when executed by the machine, further cause the machine to determine a confidence value that is associated with the first profile; and in response to a comparison of the confidence value to a threshold, use active machine learning to determine a second profile for the network device; adapt the machine learning to recognize the second profile; and display information to supplement the security event in the GUI based on the second profile.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
   in response to security events or security alerts being associated with network devices, applying, by a computer, supervised machine learning to classify the network devices according to a plurality of classes based on features associated with the network devices represented by data, wherein the security events or the security alerts are associated with a potential security threat to a computer system containing the network devices, wherein applying the supervised machine learning comprises applying ensemble machine learning using a plurality of supervised machine learning classifiers to determine a plurality of classifications, wherein each of the plurality of supervised machine learning classifiers is associated with a different data type, and wherein the different data types comprise network data, end point data, application data, database data, and operating system related data;

ranking the plurality of classifications based on confidence values associated with the plurality of classifications; and in response to at least one of the confidence values associated with the plurality of classifications being below a threshold:
   applying active machine learning to filter the plurality of classifications to identify a subset of the plurality of classifications;
   based on features associated with the security events associated with the subset of the plurality of classifications identified by the active machine learning, querying sources to determine labels for the security events, and displaying information on an investigation Graphical User Interface (GUI) to supplement at least one of the security events or the security alerts; and
   adapting the supervised machine learning based on the determined labels for the security events and the features associated with the security events.

2. The method of claim 1, further comprising:
determining the threshold based on a performance of the supervised machine learning in determining classifications for labeled data.

3. The method of claim 1, wherein applying the ensemble machine learning comprises:
using the plurality of supervised machine learning classifiers to determine respective classifications for the network devices based on data; and
determining a classification associated with a respective confidence value based on the determined respective classifications.

4. The method of claim 3, wherein determining the classification associated with the respective confidence value comprises selecting a most common classification among the respective classifications.

5. The method of claim 1, wherein:
the network devices are associated with Internet Protocol (IP) addresses; and
applying the active machine learning comprises querying a database for a label associated with a network device.

6. The method of claim 1, wherein:
applying the active machine learning comprises generating a query to a Graphical User Interface (GUI) to request a label for a network device.

7. The method of claim 1, wherein applying the active machine learning comprises:
selecting, by the supervised machine learning, data from a larger set of data associated with classifications associated with confidence values less than the threshold; and
generating a query to determine a label in response to the selection of data.

8. The method of claim 1, wherein:
applying the supervised machine learning comprises applying a neural network classifier; and
using a classification learned by the active machine learning to adapt the supervised machine learning comprises at least one of: adding a neuron to the neural network classifier, adjusting a neuron weight of the neural network classifier, or adding a neuron connection to the neural network classifier.

9. The method of claim 1, wherein using a classification learned by the active machine learning to adapt the supervised machine learning to recognize the classification comprises adding a class to a plurality of classes associated with the supervised machine learning.

10. The method of claim 1, wherein the ensemble machine learning comprises stacking.

11. The method of claim 1, wherein the ensemble machine learning comprises boosting.

12. A non-transitory machine-readable storage medium that stores instructions that, when executed by a machine, cause the machine to:
in response to at least one of security events or security alerts being associated with network devices, apply supervised machine learning to classify the network devices according to a plurality of classes based on features associated with the network devices represented by data,
wherein applying the supervised machine learning comprises applying ensemble machine learning using a plurality of supervised machine learning classifiers to determine a plurality of classifications, wherein each of the plurality of supervised machine learning classifiers is associated with a different data type, wherein the different data types comprise network data, end point data, application data, database data, and operating system related data, wherein the network devices are associated with the at least one of the security events or the security alerts displayed in an investigation Graphical User Interface (GUI), and wherein the at least one of the security events or the security alerts are associated with a potential security threat to a computer network containing the network devices;
rank the plurality of classifications based on confidence values associated with the plurality of classifications;
in response to at least one of the confidence values associated with the plurality of classifications being below a threshold, apply active machine learning to filter the plurality of classifications to identify a subset of the plurality of classifications;
based on features associated with the security events associated with the subset of the plurality of classifications identified by the active machine learning, query sources to determine labels for the security events, and display information on the investigation GUI to supplement the at least one of the security events or the security alerts; and
adapt the supervised machine learning based on the determined labels for the security events and the features associated with the security events.

13. The non-transitory machine-readable storage medium of claim 12, wherein the instructions, when executed by the machine, further cause the machine to:
classify the network devices as being associated with at least one of an operating system, a client, a server, an email software, or a database software.

14. The non-transitory machine-readable storage medium of claim 12, wherein the instructions, when executed by the machine, further cause the machine to:
merge the plurality of classifications to classify the network devices.

15. A system comprising:
at least one processor; and
a memory to store instructions to, when executed by the at least one processor, cause the at least one processor to:
in response to at least one of security events or security alerts being associated with network devices, apply supervised machine learning to classify the network devices according to a plurality of classes based on features associated with the network devices represented by data, wherein the at least one of security events or the security alerts are associated with potential security threats to a computer system containing the network devices, wherein applying the supervised machine learning comprises applying ensemble machine learning using a plurality of supervised machine learning classifiers to determine a plurality of classifications, wherein each of the plurality of supervised machine learning classifiers is associated with the different data type, and wherein the different data types comprise network data, end point data, application data, database data, and operating system related data;
rank the plurality of classifications based on confidence values associated with the plurality of classifications;
in response to at least one of the confidence values associated with the plurality of classifications being below a threshold, apply active machine learning to filter the plurality of classifications to identify a subset of the plurality of classifications;
based on features associated with the security events associated with the subset of the plurality of classifications identified by the active machine learning, query sources to determine labels for the security events, and display information on an investigation Graphical User Interface (GUI) to supplement the at least one of security events or the security alerts; and
adapt the supervised machine learning based on the determined labels for the security events and the features associated with the security events associated with the subset of the plurality of classifications identified by the active machine learning.

16. The system of claim 15, wherein the supervised machine learning is associated with a plurality of models and the instructions, when executed by the at least one processor, further cause the at least one processor to:
for each of the plurality of classifications determine a corresponding vote; and
classify a given network device based on the corresponding vote for each of the plurality of classifications.

17. The system of claim 15, wherein the instructions, when executed by the at least one processor, further cause the at least one processor to:
query a Configuration and Management Database (CMDB) to determine a label for a network device of the network devices.

18. The system of claim 15, wherein the plurality of classifications comprise classifications associated with an operating system, a client, a server, email software, or database software.

19. The system of claim 15, wherein the instructions, when executed by the at least one processor, further cause the at least one processor to display information about the network devices in a Graphical User Interface (GUI) based on the supervised machine learning.

* * * * *